US009544806B2

(12) United States Patent
Ekici et al.

(10) Patent No.: US 9,544,806 B2
(45) Date of Patent: Jan. 10, 2017

(54) METHOD AND APPARATUS IN MOBILE TELECOMMUNICATIONS SYSTEM USER EQUIPMENT FOR MANAGING CONGESTION WITHIN THE MOBILE TELECOMMUNICATIONS SYSTEM

(75) Inventors: Ozgur Ekici, Escondido, CA (US); Muhammad Khaledul Islam, Ottawa (CA); Andrew John Farnsworth, Kidderminster (GB)

(73) Assignee: BlackBerry Limited, Waterloo, Ontario (CA)

( * ) Notice: Subject to any disclaimer, the term of this patent is extended or adjusted under 35 U.S.C. 154(b) by 855 days.

(21) Appl. No.: 13/416,189

(22) Filed: Mar. 9, 2012

(65) Prior Publication Data
US 2013/0235719 A1    Sep. 12, 2013

(51) Int. Cl.
*H04W 24/02* (2009.01)
*H04W 28/02* (2009.01)

(52) U.S. Cl.
CPC ..... *H04W 28/0231* (2013.01); *H04W 28/0289* (2013.01)

(58) Field of Classification Search
CPC .... H04W 76/027; H04W 48/02; H04W 76/02; H04W 28/0289; H04W 76/046; H04W 28/02; H04W 28/0231; H04W 28/0252; H04W 28/0284
See application file for complete search history.

(56) References Cited

U.S. PATENT DOCUMENTS

| 7,991,404 | B2 * | 8/2011 | Kagimoto | ............. H04W 28/02 455/436 |
| 9,179,358 | B2 * | 11/2015 | Patil | .................... H04W 76/027 |
| 2002/0173332 | A1 * | 11/2002 | Mukai | ................ H04Q 11/0062 455/525 |
| 2003/0214931 | A1 * | 11/2003 | Nakayasu | ............. H04W 48/06 370/342 |
| 2007/0223433 | A1 * | 9/2007 | Watanabe | ............. H04W 48/06 370/338 |
| 2009/0163217 | A1 * | 6/2009 | Xu | ................................ 455/450 |
| 2010/0074182 | A1 * | 3/2010 | Shao | ............................. 370/328 |
| 2010/0329167 | A1 * | 12/2010 | Linden et al. | ................ 370/312 |
| 2011/0019633 | A1 * | 1/2011 | Tajima | ................ H04W 76/027 370/329 |
| 2012/0088495 | A1 * | 4/2012 | Tsai | .................... H04W 76/027 455/422.1 |
| 2012/0094707 | A1 * | 4/2012 | Chen | ............................ 455/517 |

(Continued)

OTHER PUBLICATIONS

U.S. Appl. No. 61/559,692, Kidon Lee, "Adaptive Stopping Rule for Ongoing Timer in Extended Access Barring and Extended Wait Timer for MTC".*

*Primary Examiner* — Hoang-Chuong Vu
(74) *Attorney, Agent, or Firm* — Thomas S. Grzesik; Fleit Gibbons Gutman Bongini & Bianco P.L.

(57) ABSTRACT

A method and apparatus for handling congestion in a mobile telecommunications system is described, the method comprising, at the user equipment monitoring messages from a cell for an indication of congestion and handing the congestion in a battery and signaling efficient manner. By one approach this comprises sending a first message to a cell, receiving a rejection (or failing to receive an acknowledgement of the message) within a period and in response, monitoring messages from the cell for an indication of congestion.

21 Claims, 6 Drawing Sheets

(56) References Cited

U.S. PATENT DOCUMENTS

| | | | |
|---|---|---|---|
| 2013/0095879 A1* | 4/2013 | Gupta | H04W 76/027 |
| | | | 455/525 |
| 2013/0100895 A1* | 4/2013 | Aghili et al. | 370/329 |
| 2013/0143615 A1* | 6/2013 | Juang | H04W 52/0222 |
| | | | 455/522 |
| 2013/0201870 A1* | 8/2013 | Gupta | 370/254 |
| 2014/0233452 A1* | 8/2014 | Kim | H04L 12/189 |
| | | | 370/312 |
| 2014/0301344 A1* | 10/2014 | Lee | 370/329 |

\* cited by examiner

METHOD AND APPARATUS IN MOBILE TELECOMMUNICATIONS SYSTEM USER EQUIPMENT FOR MANAGING CONGESTION WITHIN THE MOBILE TELECOMMUNICATIONS SYSTEM

BACKGROUND

Technical Field

This application relates to mobile telecommunications systems in general, and in particular relates to a method and apparatus in mobile telecommunications system for user equipment handling of network congestion.

Description of the Related Art

In a typical wireless cellular radio system, user equipment (UE), or a 'device', communicates via one or more radio access networks (RANs) to one or more core networks. User equipment (UE) comprises various types of equipment such as mobile telephones (also known as cellular or cell phones, including smart phones), laptops with wireless communication capability, personal digital assistants (PDAs) etc. These may be portable, hand held, pocket sized, installed in a vehicle etc and communicate voice and/or data signals with the radio access network.

In the following, reference may be made to E-UTRAN (e.g. LTE), UTRAN (e.g. UMTS) and GERAN and to particular Standards. However it should be understood that the invention is not intended to be limited to any particular mobile telecommunications system.

A radio access network covers a geographical area typically having a plurality of cell areas. Each cell area is served by at least one base station, which in UMTS and LTE may be referred to as a Node B and enhanced-Node B (eNB) respectively. The base stations communicate at radio frequencies over an air interface with the UEs within range of the base station. Several base stations may be connected to a radio network controller (RNC) in UTRAN systems which controls various activities of the base stations. The radio network controllers are typically connected to a core network.

Various standardization bodies are known to publish specifications/standards and set standards for mobile telecommunication systems. For instance, the 3GPP (Third Generation Partnership Project) has been known to publish and set standards for mobile telecommunications. Within the scope of a particular standardization body, specific partners publish and set standards in their respective areas.

Problems may arise when a UE attempts to communicate with a cell. In UMTS/WCDMA networks for example, UE connection attempts can be rejected by the network due to congestion including equipment failure etc. The congestion may be at the cell, at radio network controller (RNC) or at the entire network, for example. The congestion rejection rate may be worse in densely populated areas, or at certain/busy times of day for a given location. In such cases, if a UE wants to establish a connection from IDLE state, UTRAN typically uses rrcConnectionReject message to reject some of the UEs requesting radio resources through rrcConnectionRequest message transmission. Thus in some aspects, congestion can be defined by receipt of a rejection to a connect request, or failure to receive a response to a connection establishment message, for example. UTRAN vendors typically use a wait time information element (IE) to delay connection attempts of idle mode devices for a specified time. Networks can perform similar throttling of some connected mode UEs (UEs in CELL_PCH (excluding Enhanced Cell FACH capable UEs with a dedicated H-RNTI) and URA_PCH states by specifying a wait time in a cellUpdateConfirm message when a connected mode device initiates a cellUpdate message to request radio link resources.

During this wait time, UE's can wait in real or pseudo CELL_FACH state consuming considerable amounts of battery power. As an example, a typical UMTS UE consumes 3.5 mA during IDLE mode operation (when DRX is set to 7 which is a typically value configured by the network), whereas in CELL_FACH state the current consumption rises to 110 mA. Also, UEs' initiating the radio connection and waiting in pseudo CELL_FACH state are not reachable for paging to initiate mobile-terminated calls in this state, since neither paging control channel (PCCH) (paging TYPE1) applicable for IDLE mode, CELL_PCH and URA_PCH RRC states nor a dedicated control channel (DCCH) applicable for CELL_FACH and CELL_DCH RRC states (paging TYPE2) can reach the UEs.

Such a scenario can also occur if idle mode the UE's connection attempt is implicitly rejected by the network sending no message in response to UE's rrcConnectionRequest message (i.e. a missing rrcConnectionSetup or rrcConnectionReject message on the downlink). In this case, the UE in IDLE mode will re-try connection establishment attempt according to T-300 and N-300 setting in system information block (SIB)1.

UEs in CELL_PCH or URA_PCH states can experience a similar problem when a cellUpdate message is not acknowledged by the network via a cellUpdateConfirm message. In this scenario cellUpdate message is re-transmitted according to T-302 and N-302 setting in the network (SIB1).

For instance, consider a UE that complies with the 3GPP specifications, for instance the UMTS/UTRAN and/or LTE/E-UTRAN protocols. The 3GPP technical specification 25.331, referred to herein as TS 25.331, for example, release 10, addresses the subject of UMTS RRC (Radio Resource Control) protocol requirements between the Radio Access Network (UTRAN) and the UE.

Section 8.1.3.9 of 3GPP TS 25.331 v.10.3.0 states as follows:

"if the IE "wait time" <> '0', wait at least the time stated in the IE "wait time".

Thus, there is no explicit indication from the 3GPP specification "Standard" of an RRC state for a UE to wait in.

Additionally, UEs are required to go through rrcConnectionRequest transmission to conclude that the network is congested (by reception of an rrcConnectionReject message). This is battery and signalling intensive causing extra strain on already congested network and limited battery capacity of the mobile device.

There are thus proposed strategies for a method and apparatus in mobile telecommunications system for user equipment to handle congestion scenarios efficiently. A number of such strategies are detailed below.

Other aspects and features of the proposed strategy will become apparent to those ordinarily skilled in the art upon review of the following description of specific embodiments of an apparatus and method in mobile telecommunications system user equipment.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

Figure 1:
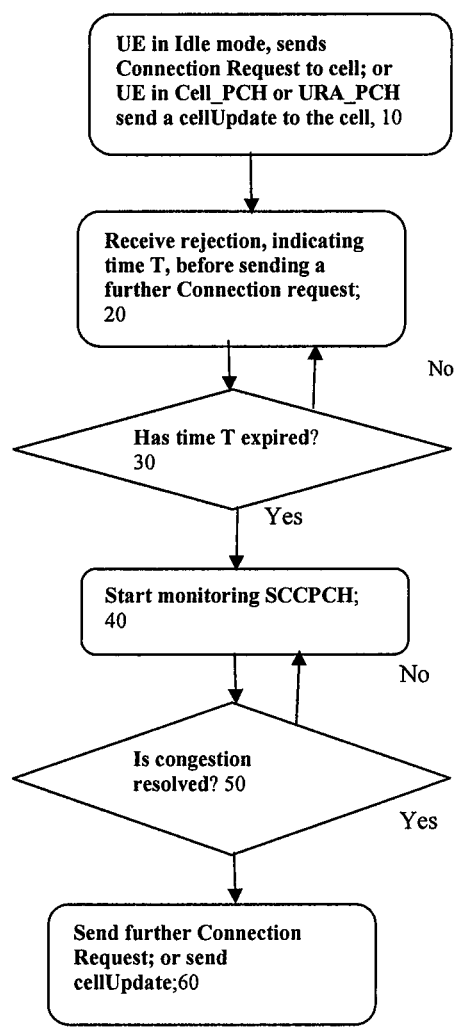
FIG. 1 illustrates a first technique in mobile telecommunications system user equipment.

An apparatus and method in mobile telecommunications system for user equipment to handle congestion scenarios efficiently is described. In the following description, for the purposes of explanation, numerous specific details are set forth in order to provide a thorough understanding of the present invention. It will be apparent, however, to one skilled in the art that the technique may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method in mobile telecommunications system for user equipment. In other aspects, there is an apparatus and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files etc. In particular, the method may be implemented in a mobile telecommunications device, with or without voice capabilities, or other electronic devices such as handheld or portable devices.

The technique relates to a method in wireless telecommunication system user equipment and in particular the operations that are undertaken in a user equipment, the method comprising, at the user equipment: sending a first message to a cell; receiving a rejection, or failing to receive an acknowledgement, of the message within a period; monitoring messages from the cell for an indication of congestion related to the cell; and sending a second message, related to the first message, when a criterion is satisfied dependent on the indication. The techniques also relate to a method in a user equipment, the method comprising, at the user equipment: sending a first message to a cell; monitoring messages from the cell for an indication of congestion related to the cell; and receiving a rejection, or failing to receive an acknowledgement, of the message within a period; monitoring messages from the cell for an indication of congestion related to the cell; and in response, when a criterion is satisfied dependent on the indication; moving to a radio off state. The techniques also relate to a wireless telecommunications device comprising: a processor; and a memory having stored therein one or more routines executable by the processor, the one or more routines being adapted to operate according to the methods described above.

In one aspect, there is a method in a user equipment, the method comprising, at the user equipment: sending a first message to a cell; receiving a rejection, or failing to receive an acknowledgement, of the message within a period; monitoring messages from the cell for an indication of congestion; and sending a second message, related to the first message, if a criterion is satisfied dependent on the indication.

Preferably the sending the second message comprises re-sending the first message. Preferably the first message is an rrcConnectionRequest message, or a cellUpdate message. The monitoring messages may comprise monitoring a common channel. The channel is preferably a Secondary Common Control Physical Channel, SCCPCH. Preferably the criterion comprises receiving a response to the first message within a predetermined time after sending; the indication of congestion being below a predetermined threshold; the indication of congestion being such that a rejection is not received, or would not be expected in response to sending a second message, or the cell has not sent any rrcConnectionReject messages within a previous period and/or another UE has received an rrcConnectionSetup message.

In another aspect there is a method in a user equipment, the method comprising, at the user equipment:

sending a first message to a cell; monitoring messages from the cell for an indication of congestion related to the cell; and receiving a rejection, or failing to receive an acknowledgement, of the message within a period; monitoring messages from the cell for an indication of congestion related to the cell; and in response, when a criterion is satisfied dependent on the indication; moving to a radio off state.

Preferably, there is remaining in the radio off state: until a second message is sent; or until attempting to re-send the first message; or for a predetermined time period indicated in the rejection. Preferably the second message relates to the first message. The message may be monitored are on a common channel. The criterion may comprise determining that the congestion is not associated with a low layer of the network. The criterion may be dependent upon uplink interference, a retransmission scheme, or one or more DL messages Preferably the congestion relates to the cell, or a network in which the cell is operable.

In another aspect there is a wireless telecommunications device comprising: a processor; and a memory having stored therein one or more routines executable by the processor, the one or more routines being adapted to operate according to a method described herein.

In another aspects there is a computer-readable medium having computer-executable instructions adapted to cause a device to perform according to a method described herein.

EXAMPLE 1

According to the first example, a UE (in IDLE mode) attempts to connect to a cell within a network by sending an rrcConnectionRequest message. The cell rejects the request, due in this example to congestion. In different aspects, other possibilities are envisaged such as network failure, high uplink interference etc. . . . The cell rejects the request by sending an rrcConnectionReject message. The rrcConnectionReject message includes a waitTime IE defining a delay for the next radio connection attempt.

After the waitTime elapses, previously UEs have been required to go through another rrcConnectionRequest message transmission, and then rrcConnectionReject message reception, to conclude that the network is congested.

According to this example, it is recognised that some reject messages on the downlink are transmitted in secondary common control channels (SCCPCH) in UTRAN where UEs are identified by an initial UE identity (e.g. TMSI or PTMSI).

After waitTime has elapsed, the UE monitors the message transmitted on SCCPCH for other UEs (these messages, which are not ciphered, can be decoded by any UE), and preferably itself, to assess the state of congestion of the network (i.e. to see if the congestion has been resolved or not).

If it is determined that there is still significant congestion (i.e. such that a further uplink messages like rrcConnection-Requests are likely to be rejected for example), then the UE can choose not to attempt another rrcConnectionRequest message transmission at this time, which will save battery power by avoiding transmission on the uplink which has a high likelihood of being rejected anyway. The UE not sending additional rrcConnectionReject messages, which would be rejected anyway, also helps to reduce uplink interference in the cell, which imposes radio resource constraints on the shared uplink. Uplink interference can otherwise increase significantly if a large number of UEs are all attempting to connect simultaneously.

Thus, the UE does not have to go through repeated uplink transmission procedures, so battery resources and network radio resources are saved. If the UE ascertains that there are no rrcConnectionreject messages detected for other users or a number of rrcConnectionReject messages below a predefined threshold, or if other UEs are getting positive radio resource allocation messages like rrcConnectionSetup for example, then the UE can conclude that the congestion issue is resolved and can now initiate connection establishment attempts.

According to one aspect of this example, the amount of time spent waiting before the next rrcConnectionRequest message may depend upon the applications that invoked the connection request. For example, if an emergency call attempt is being made and gets rejected by the network, timing of attempts for retry may be different to non-emergency call attempts.

In an alternative to this example, the SCCPCH channels may be monitored during a predetermined time before sending the rrcConnectionRequest message. In another example SCCPCH, is monitored only when the UE will want to make a repeated request, or a related request after or before expiry of the waitTime.

This process is illustrated in FIG. 1. First the UE, in 10, starting in IDLE mode, sends a rrcConnectionRequest message to the cell. In 20, the UE receives an rrcConnection-Reject message, that indicates a waitTime. In 30, there is a determination of whether the waitTime has expired. If it has not, then the UE continues to wait, 20. If it has, then in 40 the UE monitors (processes messages sent on) the common channel SCCPCH for an indication of the congestion related to the cell. As noted above, the monitoring may begin at another time.

In 50, it is determined whether, from the monitoring, the congestion issue has been resolved. If it has not, then there is not a reattempt of sending a message at this time, but rather the monitoring continues at 40. In this scenario, where the UE decides that the congestion is not resolved, it may in one aspect behave as if it received an rrcConnectionReject message and wait for a duration of another full waitTime. If the congestion has been resolved, then in 60 the UE sends a new rrcConnectionRequest message to the cell.

In variations to this example, the SCCPCH is monitored for other access/connection reject messages for other UEs, and optionally the UE making the request.

In summary, this example utilizes observed congestion information from a shared control channel to determine whether or not to perform (another) connection request.

In a variation to this example, the UE can be in one of the connected states, Cell_PCH, or URA_PCH, and sends a cellUpdate to the cell.

EXAMPLE 2

According to this example, there is "implicit" rejection by the network of a message sent by the UE. An attempt by the UE to establish a channel with an rrcConnectionRequest message on the uplink is implicitly rejected by the network when the UE does not receive any message in response to an rrcConnectionRequest message within a predetermined time period. That is, there is no rrcConnectionSetup and/or rrc-ConnectionReject messages directed to the UE on the downlink. This example also applies to the situation where UEs in CELL_PCH and URA_PCH RRC states send a cellUpdate message, and this is not acknowledged by the network via a cellUpdateConfirm message.

As for example 1, the UE transmits the original message on the uplink and monitors the network's response on downlink SCCPCH channel. After monitoring the downlink SCCPCH channel, if the UE concludes that the congestion issue has been resolved (or has "ended"), then it can attempt for connection establishment again and transmit an uplink message relating to the original message.

Figure 2:
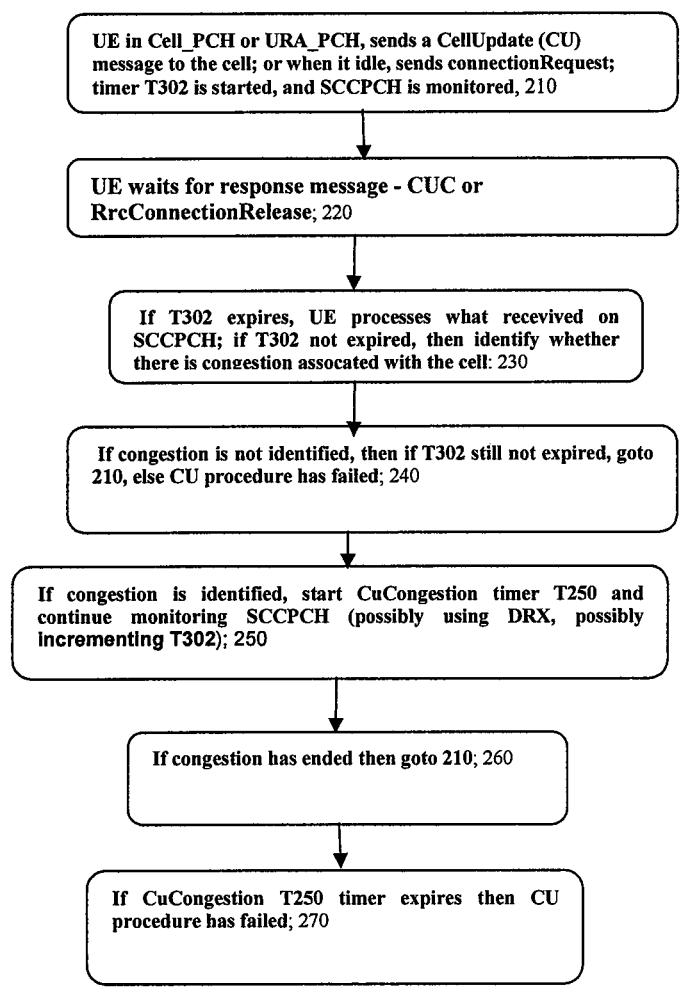
FIG. 2 illustrates a second technique in mobile telecommunications system user equipment.

FIG. 2 illustrates this example for the case of a UE starting in one of the Connected mode states CELL_PCH or URA_PCH as well as IDLE mode.

Here, in 210, in a sample scenario the UE starts in a connected mode state CELL_PCH or URA_PCH, and sends a cellUpdate (CU) message. In 220, the UE waits for response message—cellUpdateConform or rrcConnection-Release. In 230, if T302 expires, the UE processes what was observed (received) on SCCPCH during the T302 timer period, and determines whether the congestion associated with the cell is relieved or not. If congestion is not detected, in 240, then if V302 counter permits, the method returns to 210, and transmits cellUpdate message on the uplink. If V302 timer reaches to the maximum value possible according to the network configuration (N-302 parameter) then the cellUpdate procedure is considered to be failed.

In 250, if congestion is identified, in one variation, the UE waits a specified amount of time (e.g. T302 or more) before initiating monitoring SCCPCH on the downlink In 250, if congestion has been resolved, or the likelihood of rejection to a connection request is minimal, (for instance, if the monitoring reveals that there are no rrcConnection-Reject or cellUpdateConfirm messages with waitTime configured for other UEs or if other UEs are getting rrcConnectionSetup or cellUpdateConfirm messages with no waitTime configured) then the method moves to 260; and a further cellUpdate message is sent if V302 counter and N302 constant permits. Otherwise, the cellUpdate procedure is considered to be failed.

Examples 1 and 2 can be considered in relation to a UE in dormant states, such as IDLE, CELL_PCH and URA_PCH having equivalent messages (having cellUpdate and rrcConnectionRequest messages on the uplink and cellUpdateConfirm and rrcConnectionSetup messages on the downlink common channels).

EXAMPLE 3

According to this example, which can be considered on its own, or in combination with example 1 and/or 2; after an explicit (receipt of a rejection message) or implicit (failure to receive an acknowledgement) rejection of a message by a cell, for instance reflecting congestion at the cell, the UE can, depending on the type of congestion, move to radio off state while the congestion remains. This is instead of remaining in, for example, a pseudo CELL_FACH or DRX mode of operation (i.e. a UE in IDLE state trying to re-establish connection). This has significant advantages in saving battery resources, especially if the UE is performing connection establishment from connected RRC states like CELL_PCH or URA_PCH where the DRX cycle is shorter compared to IDLE mode.

Whether a UE moves to a radio off state during the waitTime (or for T302 duration for implicit rejection), is dependent in this example upon where the network congestion is experienced. If the congestion is on radio level (on Node B), then regardless of the page reception on the downlink, the UE would not be able to establish a connection anyway because it won't be able to reach Node B which relays the connection establishment message to RNC which in turn might implement service prioritization. Therefore in this scenario, when the UE has determined that the congestion is on the lower layers of the network (radio layer on Node B), then the UE may wait in radio off state (for example, the UE switches its receiver off).

The UE can estimate if congestion originated/is at/mostly focused on the RNC (core network) or Node B level by checking an uplink interference level (e.g. determining if it is elevated, for instance looking to information in SIB7), or if the UE follows T300/N300 retransmission scheme, or by receiving rrcConnectionRejects etc. . . . That is, there is in one aspect a comparison of UL interference to a threshold and UL interference meets a criterion in relation to the threshold (e.g. it is bigger than) then it is concluded that congestion is probably radio based rather than RNC based.

Figure 3:
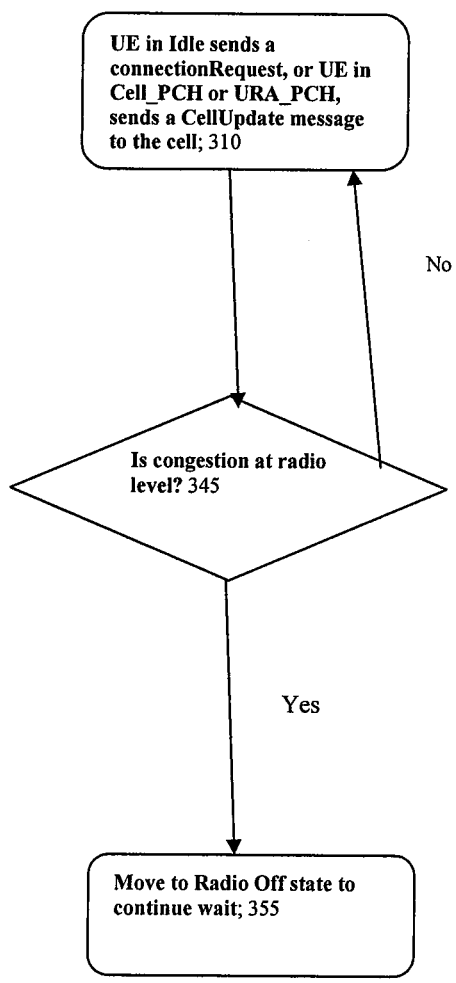
FIG. 3 illustrates a third technique in mobile telecommunications system user equipment.

This example is illustrated in FIG. 3 for connection establishment in connected states (CELL_PCH or URA_PCH). In 310, the UE initiates the original connection establishment request by an uplink message transmission and waiting for the network's response. During this period the UE evaluates the congestion level and type in the network. This may either be by virtue of failing to receive acknowledgements or detecting elevated uplink interference on Node-B (by reading uplinkInterference IE in SIB7). In 345, there is a determination of where the congestion is being experienced. If it is decided to be at the radio level, then in the UE remains in radio off state for a specific duration of time. In one variation of implementation, the UE can behave as if it received an rrcConnectionReject message with a specific waitTime IE targeted to other UEs.

There can be exceptions to this example, for instance, when a UE may be in an emergency call-back mode.

In summary, the UE waits in a radio off state in certain situations of depending upon the (e.g. location of) the congestion, where it is not possible to establish a connection even if the device detects a page on the downlink.

Figure 4:
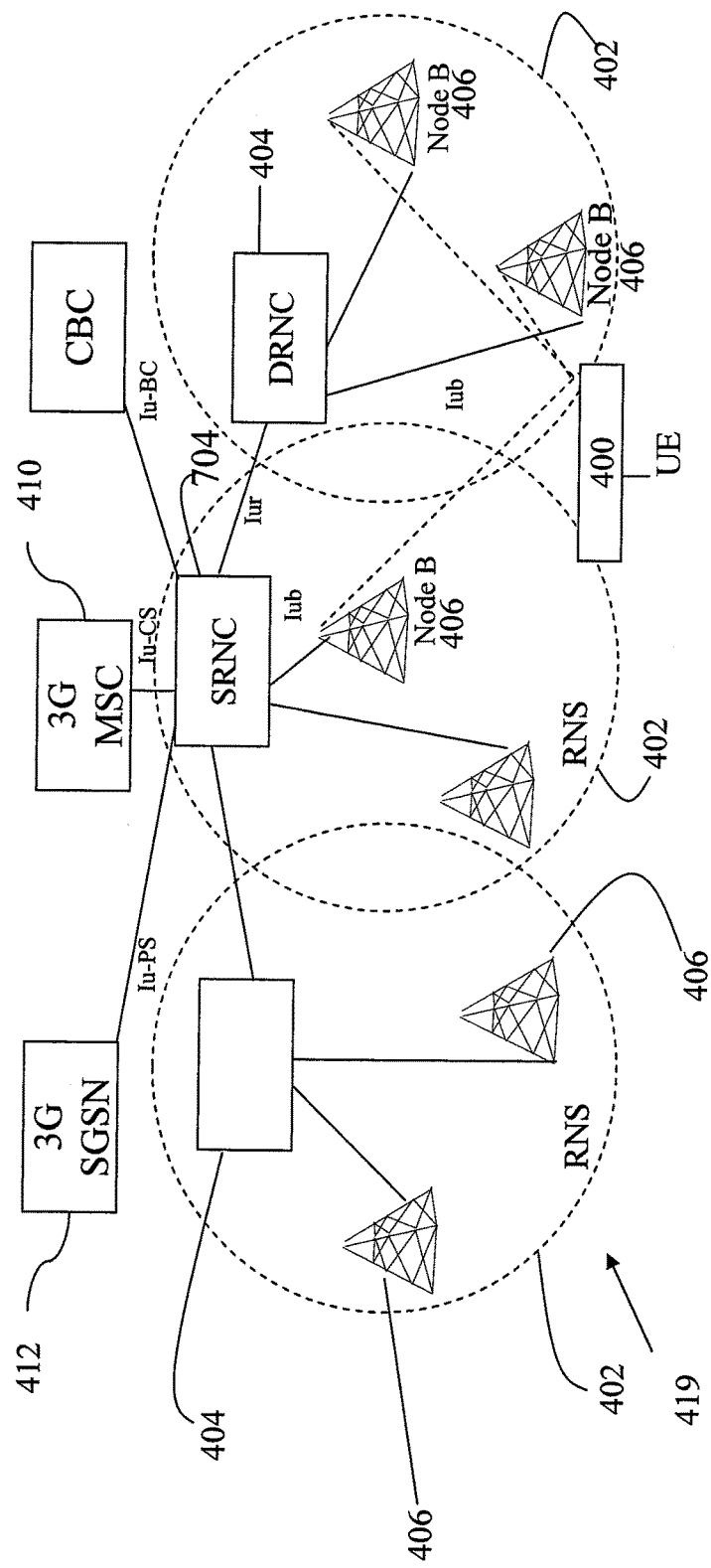
FIG. 4 shows an overview of a network and a user equipment device.

FIG. 4 shows an overview of a network and a UE device. Clearly in practice there may be many UE devices operating with the network but, for the sake of simplicity, FIG. 4 only shows a single UE device 400. For the purposes of illustration, FIG. 4 also shows a network 419 having a few components. It will be clear to a person skilled in the art that in practice a network will include far more components than those shown.

FIG. 4 shows an overview of the radio access network 419 (e.g. E-UTRAN) used in a mobile communications system. The network 419 as shown in FIG. 4 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 400 may be mobile within the radio access network. Radio connections (indicated by the straight dotted lines in FIG. 4) are established between the UE and one or more of the Node Bs in the network 419.

The radio network controller controls the use and reliability of the radio resources within the RNS 2. Each RNC may also connected to a 3G mobile switching centre 10 (3G MSC) and a 3G serving GPRS support node 12 (3G SGSN).

Figure 5:
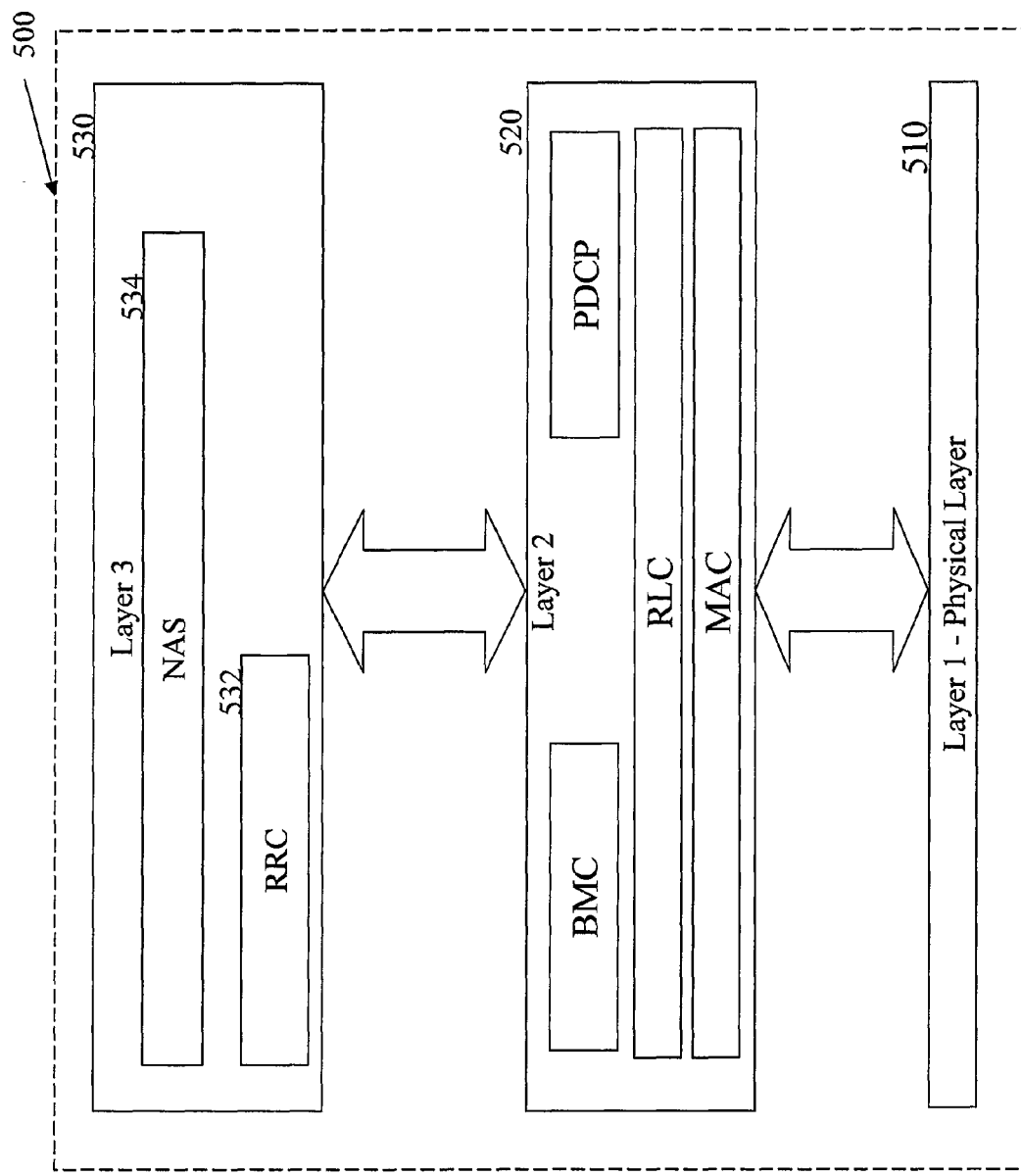
FIG. 5 is a block diagram illustrating an embodiment of a protocol stack apparatus provided with a RRC block, in accordance with the present application.

FIG. 5 is a block diagram illustrating an embodiment of a protocol stack provided in a UE. A Radio Resource Controller (RRC) block 532 is a sub layer of Layer 3 530 of a protocol stack 500. The RRC 532 exists in the control plane only and provides an information transfer service to the non-access stratum NAS 534. The RRC 532 is responsible for controlling the configuration of radio interface Layer 1 510 and Layer 2 520. When the network wishes to change the UE configuration it will issue a message to the UE containing a command to invoke a specific RRC procedure. The RRC layer 532 of the UE decodes this message and initiates the appropriate RRC procedure. Generally when the procedure has been completed (either successfully or not) then the RRC sends a response message to the network (via the lower layers) informing the network of the outcome. It should be noted that there are a few scenarios where the RRC will not issue a response message to the network and, in those cases the RRC need not and does not reply.

The strategies in mobile telecommunications system user equipment as discussed above with reference to the drawings may be implemented by the RRC block 532.

Figure 6:
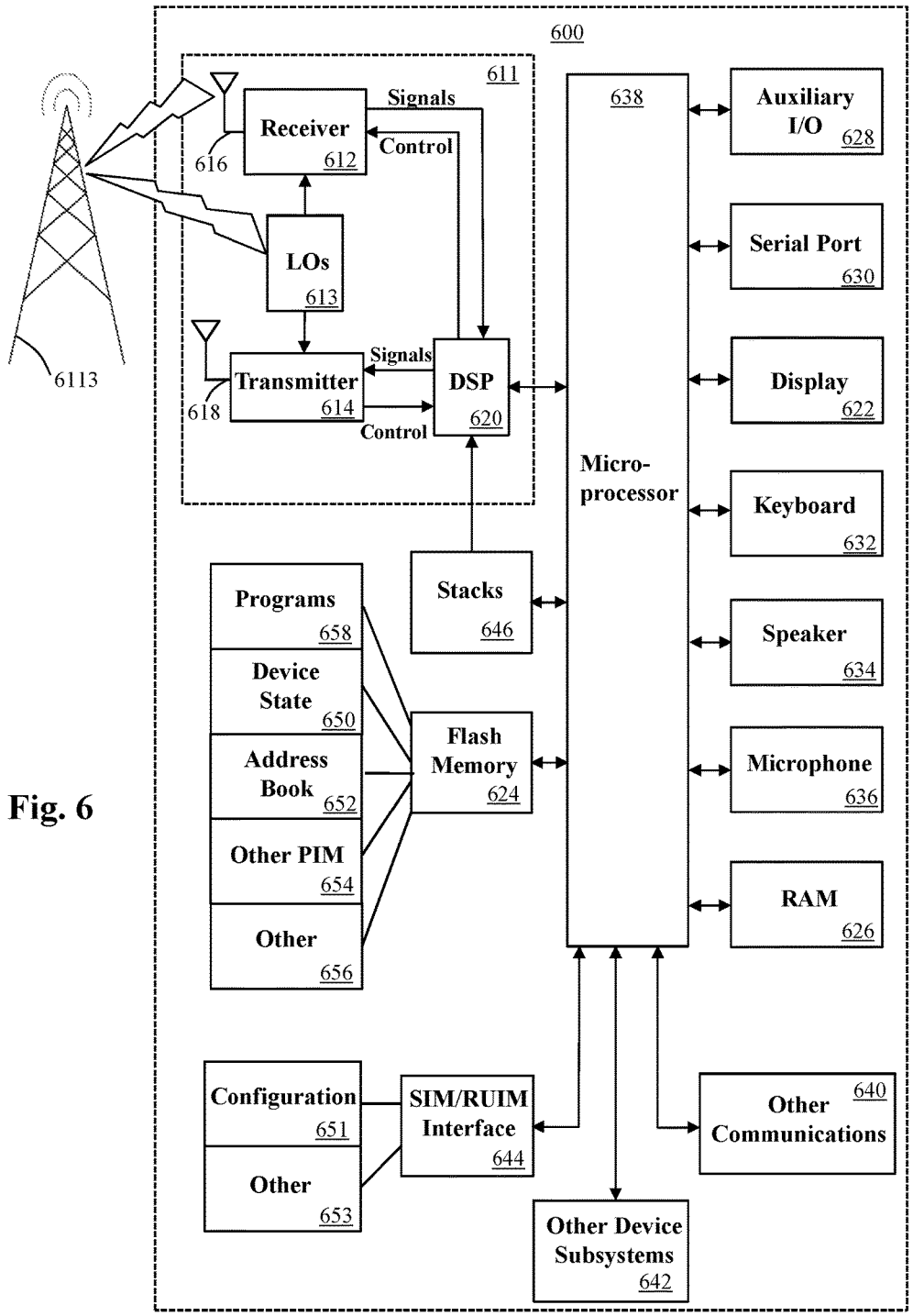
FIG. 6 is a block diagram illustrating a mobile device, which can act as a UE and co-operate with the apparatus and methods of FIGS. 1 to 4.

Turning now to FIG. 6, FIG. 6 is a block diagram illustrating a mobile device, which can act as a UE and co-operate with the apparatus and methods of FIGS. 1 to 4, and which is an exemplary wireless communication device. Mobile station 600 is preferably a two-way wireless communication device having at least voice and data communication capabilities. Mobile station 600 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 600 is enabled for two-way communication, it will incorporate a communication subsystem 611, including both a receiver 612 and a transmitter 614, as well as associated components such as one or more, preferably embedded or internal, antenna elements 616 and 616, local oscillators (LOs) 613, and processing means such as a processing module such as a digital signal processor (DSP) 620. As will be apparent to those skilled in the field of communications, the particular design of the communication subsystem 611 will be dependent upon the communication network in which the device is intended to operate. For example, mobile station 600 may include a communication subsystem 611 designed to operate within the Mobitex™ mobile communication system, the DataTAC™ mobile communication system, GPRS network, UMTS network, EDGE network, LTE network etc.

Network access requirements will also vary depending upon the type of network 602. For example, in the Mobitex and DataTAC networks, mobile station 600 is registered on the network using a unique identification number associated with each mobile station. In UMTS and GPRS networks, however, network access is associated with a subscriber or user of mobile station 600. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 600 will be unable to carry out any other functions involving communications over the network 602. The SIM interface 644 is normally similar to a card-slot into which a SIM card can be inserted and ejected like a diskette or PCMCIA card. The SIM card has memory and may hold many key configuration 651, and other information 653 such as identification, and subscriber related information.

When required network registration or activation procedures have been completed, mobile station 600 may send and receive communication signals over the network 602. Signals received by antenna 616 through communication network 602 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 602 via antenna 616. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile station 600 preferably includes processing means such as a microprocessor 636 which controls the overall operation of the device. Communication functions, including at least data and voice communications, are performed through communication subsystem 611. Microprocessor 636 also interacts with further device subsystems such as the display 622, flash memory 624, random access memory (RAM) 626, auxiliary input/output (I/O) subsystems 626, serial port 630, keyboard 632, speaker 634, microphone 636, a short-range communications subsystem 640 and any other device subsystems generally designated as 642.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 636 is preferably stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 656 and program data storage 650, 652, 654 and 656. These different storage types indicate that each program can allocate a portion of flash memory 624 for their own data storage requirements. Microprocessor 636, in addition to its operating system functions, preferably enables execution of software applications on the mobile station. A predetermined set of applications that control basic operations, including at least data and voice communication applications for example, will normally be installed on mobile station 600 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 602. In a preferred embodiment, the PIM data items are seamlessly integrated, synchronized and updated, via the wireless network 602, with the mobile station user's corresponding data items stored or associated with a host computer system. Further applications may also be loaded onto the mobile station 600 through the network 602, an auxiliary I/O subsystem 626, serial port 630, short-range communications subsystem 640 or any other suitable subsystem 642, and installed by a user in the RAM 626 or preferably a non-volatile store (not shown) for execution by the microprocessor 636. Such flexibility in application installation increases the functionality of the device and may provide enhanced on-device functions, communication-related functions, or both. For example, secure communication applications may enable electronic commerce functions and other such financial transactions to be performed using the mobile station 600.

In a data communication mode, a received signal such as a text message or web page download will be processed by the communication subsystem 611 and input to the microprocessor 636, which preferably further processes the received signal for output to the display 622, or alternatively to an auxiliary I/O device 626. A user of mobile station 600 may also compose data items such as email messages for example, using the keyboard 632, which is preferably a complete alphanumeric keyboard or telephone-type keypad, in conjunction with the display 622 and possibly an auxiliary I/O device 626. Such composed items may then be transmitted over a communication network through the communication subsystem 611.

For voice communications, overall operation of mobile station 600 is similar, except that received signals would preferably be output to a speaker 634 and signals for transmission would be generated by a microphone 636. Alternative voice or audio I/O subsystems, such as a voice message recording subsystem, may also be implemented on mobile station 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6, would normally be implemented in a personal digital assistant (PDA)-type mobile station for which synchronization with a user's desktop computer (not shown) may be desirable, but is an optional device component. Such a port 630 would enable a user to set preferences through an external device or software application and would extend the capabilities of mobile station 600 by providing for information or software downloads to mobile station 600 other than through a wireless communication network. The alternate download path may for example be used to load an encryption key onto the device through a direct and thus reliable and trusted connection to thereby enable secure device communication.

Other communications subsystems 640, such as a short-range communications subsystem, is a further optional component which may provide for communication between mobile station 600 and different systems or devices, which need not necessarily be similar devices. For example, the subsystem 640 may include an infrared device and associated circuits and components or a Bluetooth™ communication module to provide for communication with similarly enabled systems and devices.

When mobile device 600 is used as a UE, protocol stacks 646 include processes for operating as described in mobile telecommunications system user equipment.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method in a user equipment, the method comprising, at the user equipment:
 sending a first message to a cell;
 receiving a rejection, or failing to receive an acknowledgement, of the first message within a period and in response:
  monitoring individual messages from the cell addressed to other individual user equipment devices for an indication of congestion; and
  sending a second message, related to the first message, if a criterion is satisfied dependent on the indication.

2. The method of claim 1, where sending the second message comprises re-sending the first message.

3. The method of claim 1, in which the first message comprises an
 rrcConnectionRequest message,
 or a cellUpdate message.

4. The method of claim 1, in which
 monitoring the individual messages comprises monitoring a common channel.

5. The method of claim 1, in which
 monitoring the individual messages comprises monitoring a common channel; and
 wherein the channel comprises a Secondary Common Control Physical Channel, SCCPCH.

6. The method of claim 1, in which the criterion comprises
 receiving a response to the first message within a threshold time after sending;
 the indication of congestion being below a threshold;
 the indication of congestion being such that a rejection is not received, or would not be expected in response to sending a second message, or the cell has not sent any rrcConnectionReject messages within a previous period and/or another UE has received an rrcConnectionSetup message.

7. The method of claim 1, in which the congestion relates to the cell, or a network in which the cell is operable.

8. A method in a user equipment, the method comprising, at the user equipment:
 sending a first message to a cell;
 monitoring individual messages from the cell addressed to other individual user equipment devices for an indication of congestion related to the cell; and
 receiving a rejection, or failing to receive an acknowledgement, of the first message within a period and in response:
  monitoring the individual messages from the cell for the indication of congestion related to the cell; and
  when a criterion is satisfied dependent on the indication;
  moving to a radio off state.

9. The method of claim 8, further including remaining in the radio off state:
 until a second message is sent; or
 until attempting to re-send the first message; or
 for a predetermined time period indicated in the rejection.

10. The method of claim 8, wherein the second message relates to the first message.

11. The method as claimed in claim 8, in which the individual messages monitored are on a common channel.

12. The method of claim 8, in which the criterion comprises determining that the congestion is not associated with a low layer of the network.

13. The method of claim 8, in which the criterion is dependent upon uplink interference, a retransmission scheme, or one or more DL messages.

14. The method of claim 8, in which the congestion relates to the cell, or a network in which the cell is operable.

15. A wireless telecommunications device comprising:
 a processor; and a memory having stored therein one or more routines executable by the processor, the one or more routines being adapted to operate to send a first message to a cell;

receive a rejection, or failing to receive an acknowledgement, of the first message within a period and in response:

monitor individual messages from the cell addressed to other individual wireless telecommunications devices for an indication of congestion; and send a second message, related to the first message, if a criterion is satisfied dependent on the indication.

16. The wireless telecommunications device of claim 15, where sending the second message comprises re-sending the first message.

17. The wireless telecommunications device of claim 15, in which the first message comprises an rrcConnectionRequest message, or a cellUpdate message.

18. The wireless telecommunications device of claim 15, in which monitoring the individual messages comprises monitoring a common channel.

19. The wireless telecommunications device of claim 15, in which monitoring the individual messages comprises monitoring a common channel; and wherein where the channel comprises a Secondary Common Control Physical Channel, SCCPCH.

20. The wireless telecommunications device of claim 15, in which the criterion comprises receiving a response to the first message within a threshold time after sending;

the indication of congestion being below a threshold;

the indication of congestion being such that a rejection is not received, or would not be expected in response to sending a second message, or the cell has not sent any rrcConnectionReject messages within a previous period and/or another UE has received an rrcConnectionSetup message.

21. A computer-readable non-transitory medium having computer-executable instructions adapted to cause a user equipment device to:

send a first message to a cell;

receive a rejection, or failing to receive an acknowledgement, of the first message within a period and in response:

monitor individual messages from the cell addressed to other individual user equipment devices for an indication of congestion; and send a second message, related to the first message, if a criterion is satisfied dependent on the indication.

* * * * *

UNITED STATES PATENT AND TRADEMARK OFFICE
CERTIFICATE OF CORRECTION

PATENT NO. : 9,544,806 B2
APPLICATION NO. : 13/416189
DATED : January 10, 2017
INVENTOR(S) : Ozgur Ekici et al.

It is certified that error appears in the above-identified patent and that said Letters Patent is hereby corrected as shown below:

In the Claims

In Column 14, Line 1, Claim 19, delete "where"

Signed and Sealed this
Fourth Day of April, 2017

Michelle K. Lee
*Director of the United States Patent and Trademark Office*